US012145075B2

(12) United States Patent
Bugh

(10) Patent No.: US 12,145,075 B2
(45) Date of Patent: Nov. 19, 2024

(54) BINGO-STYLE GAME AND METHOD THEREOF

(71) Applicants: Robert Bugh, Mesa, AZ (US); THISSPACE LLC, Mesa, AZ (US)

(72) Inventor: Robert Bugh, Mesa, AZ (US)

(73) Assignee: THIS SPACE LLC, Mesa, AZ (US)

( * ) Notice: Subject to any disclaimer, the term of this patent is extended or adjusted under 35 U.S.C. 154(b) by 0 days.

(21) Appl. No.: 17/542,467

(22) PCT Filed: Jun. 19, 2019

(86) PCT No.: PCT/US2019/038033
§ 371 (c)(1),
(2) Date: Dec. 5, 2021

(87) PCT Pub. No.: WO2020/256724
PCT Pub. Date: Dec. 24, 2020

(65) Prior Publication Data
US 2023/0123161 A1 Apr. 20, 2023

(51) Int. Cl.
*A63F 3/06* (2006.01)
*G07F 17/32* (2006.01)

(52) U.S. Cl.
CPC ........ *A63F 3/0645* (2013.01); *G07F 17/3288* (2013.01); *G07F 17/3293* (2013.01)

(58) Field of Classification Search
CPC ........... A63F 3/06; A63F 3/0645; G07F 17/32
See application file for complete search history.

(56) References Cited

U.S. PATENT DOCUMENTS

2003/0224847 A1* 12/2003 Jaimet ...................... A63F 3/06 463/19
2020/0020202 A1* 1/2020 Kim ...................... G06Q 50/34

* cited by examiner

*Primary Examiner* — Omkar A Deodhar

(57) ABSTRACT

The invention involves an method, which includes providing a plurality of game cards, each having a grid of tiles formed in a plurality of rows and a plurality of columns. Each tile corresponds to a defined result chosen from a plurality of defined results. The method includes selecting a tile from each of the plurality of game cards, and comparing the defined result of the selected tile to a selected one of the plurality of defined results. The selected one of the plurality of defined results is selected in response to an occurrence.

25 Claims, 11 Drawing Sheets

105

Table of Defined Results- Baseball

| OUT RECORDED (O) | STRIKEOUT (K,C) | EXTRA BASES (X,H) | ON FIRST (F) |
|---|---|---|---|
| Fly Out | Strike Out-Put Out | Double | Single |
| Ground Out | Called Strike**(C) | Triple | Walk |
| Line Out | Swinging | Home Run**(H) | Hit by Pitch |
| Pop Up | Foul Tip Caught | | K, No Put Out |
| Fielder's Choice | | | Catcher's Interference |
| Sacrifice Fly | | | Error |
| Sacrifice Bunt | | | Fielder's Choice |
| Double Play w/Batted Ball | | | |
| Triple Play w/Batted Ball | | | |
| Infield Fly Rule | | | |

FIG. 1

105

Table of Defined Results- Baseball

| OUT RECORDED (O) | STRIKEOUT (K,C) | EXTRA BASES (X,H) | ON FIRST (F) |
|---|---|---|---|
| Fly Out | Strike Out-Put Out | Double | Single |
| Ground Out | Called Strike**(C) | Triple | Walk |
| Line Out | Swinging | Home Run**(H) | Hit by Pitch |
| Pop Up | Foul Tip Caught | | K, No Put Out |
| Fielder's Choice | | | Catcher's Interference |
| Sacrifice Fly | | | Error |
| Sacrifice Bunt | | | Fielder's Choice |
| Double Play w/Batted Ball | | | |
| Triple Play w/Batted Ball | | | |
| Infield Fly Rule | | | |

FIG. 2

107

Table of Defined Results- American-Style football

| FIRST DOWN (F,4) | SCORE (S) | POSSESSION CHANGE (C,T) | PUNT (P) |
|---|---|---|---|
| Pass | Touchdown | End of Half or Game | Blocked Punt |
| Run | Field Goal | Missed 4th Down Conversion | Muffed Punt Reception |
| Penalty | | Missed Field Goal | |
| Fake Punt**(4) | | Fake Punt not converted | |
| Fake FG**(4) | | Fake FG not converted | |
| | | Fumble Lost (T) | |
| | | Interception (T) | |
| | | Safety (T) | |
| | | Muffed Snap (C or T) | |

BINGO-STYLE GAME AND METHOD THEREOF

CROSS-REFERENCE TO RELATED APPLICATIONS

This invention is related to and claims priority to PCT Application No. PCT/US2019/038033, filed on Jun. 19, 2019, the disclosure of which is incorporated by reference as though fully set forth herein.

BACKGROUND OF THE INVENTION

Field of the Invention

This invention relates generally to games and, more particularly, to a bingo-style game which is played in conjunction with a sporting event.

Description of the Related Art

Sporting events have long been an attraction bringing people together for the enjoyment of the game, the great feats of the athletes, the lessons of winning and losing, bragging rights and betting purposes. Sporting events are big business and a regular past time for many around the world. They provide cause for a unity of nations, cities, regions and people.

People enjoy the sporting event more when the score is close. However, their attention diverts elsewhere when the event is not competitive. This is especially true when their team is losing because the interest of the people wanes. For these moments and to bring more enjoyment and excitement to any sporting event, several bingo-type game variations have been proposed, wherein the bingo-style game is played in conjunction with the sporting event.

One bingo-style game variation asks the participants to watch the advertising in the zones of play of a televised sporting event. However, this bingo-style game actually averts their attention from the sporting event being televised.

Another bingo-style game variation uses a plurality of results in the bingo cards that match game occurrences of the sporting event. This plurality of results is used to populate the bingo cards, but creates complex results. For example, the participants may not realize a result has occurred. Further, some results are so rare that participants may be discouraged from paying attention to the bingo-style game.

Another bingo-style game variation uses less results and works best for baseball. This game variation forms a 3×3 (or 3 by 3) grid, wherein each player position is defined to one square of the grid. The player position is given a selection of defined results, wherein the defined results include offensive and defensive defined results. However, baseball player positions are well-defined, unlike other sports where the weaknesses of this variation becomes evident.

For American football, if each of the eleven offensive and defensive player positions is defined to one square, the result is a huge 11×11 grid. If only the eleven offensive players or defensive players are used, the result is a grid of three rows of three columns and one row of two columns or some similar irregular grid. Also, football player positions are not as well defined as in baseball There are eleven players on the field but it is common to have one, two or, in college, possibly three running backs. Wide receivers come in single receiver sets all the way to a shotgun set using four wide receivers, one of the players most often playing as a tight end. Hence, matching squares to player positions becomes unreliable and therefore likely unattractive in holding the participants attention.

For basketball, player positions are even less identifiable than football. A single player may play a guard, forward and center position all in one game. Most participants would not blow if a player is designated a small guard, shooting guard or a point guard. In a twin towers set, two players most often identified as centers are used, but one would actually be designated a power forward. Participants could not make sense and are likely to become frustrated, even irate, trying to understand their game card not matching the official scorer position.

Hence, it is desirable to provide a bingo-style game, which is played in conjunction with a sporting event, wherein the bingo-style game entertains the participants and keeps their attention focused on the sporting event.

BRIEF SUMMARY OF THE INVENTION

The present invention involves a bingo-style game, which is played in conjunction with a sporting event, wherein the bingo-style game entertains the participants and keeps their attention on the sporting event. The invention will be best understood from the following description when read in conjunction with the accompanying drawings.

BRIEF DESCRIPTION OF THE DRAWINGS

FIG. 1 is a table of defined results for a live sporting event corresponding to a baseball game.

FIG. 2 is a table of defined results for a live sporting event corresponding to a football game.

DETAILED DESCRIPTION OF THE INVENTION

Figure 3:
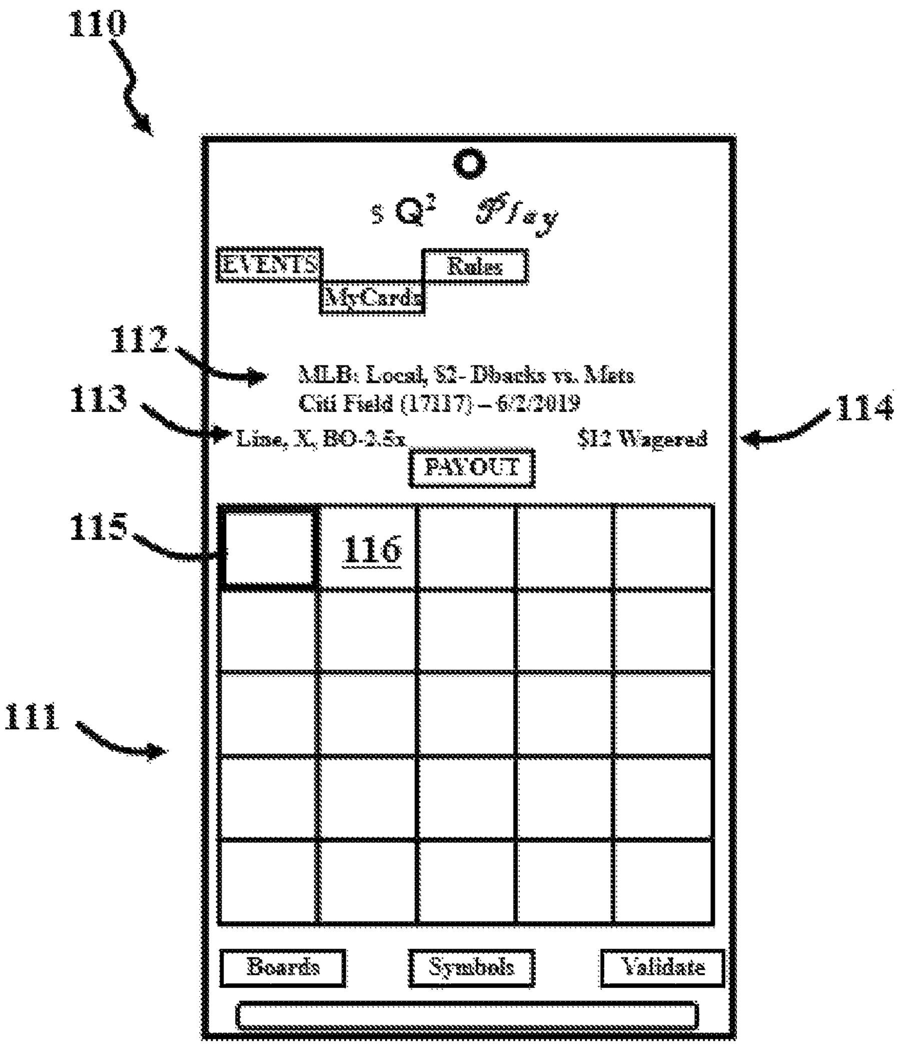
FIG. 3 is an embodiment of a game card, wherein the game card is used with the bingo-style game disclosed herein.

Disclosed herein are several embodiments of a bingo-style game, which is played in conjunction with a live sporting event, wherein the bingo-style game entertains the participants and keeps their attention on the live sporting event. The live sporting event can be of many different types, such as baseball, football hockey, soccer, basketball, etc. It should be noted that the bingo-style game can be played electronically or using paper game cards, or combinations thereof.

The bingo-style game uses a key element of the live sporting event to deliver a single result, one at a time, from a limited set of defined results. The defined results can be of many different types depending on the live sporting event. The set of defined results is typically between four to eight defined results.

The bingo-style game uses a repetitive key element, i.e. a ball handler, within the live sporting event such as an athletic competition, game, contest or series thereof, to deliver randomly-generated defined results one at a time from the set of defined results until the live sporting event concludes. Events include the key elements delivering the randomly-generated defined results used to compare to the pre-populated defined results, one square at a time, on one or more game cards.

In one embodiment, each participant in the bingo-style game is playing the same square of a grid of the participant's corresponding game card Once that square is played, each participant moves to the same next square of the participant's corresponding game card, which is played next. In some embodiments, each participant moves to the same next square of the participant's corresponding game card, which is played next by all the participants. This sequence continues until the event ends or until a winner has been determined. In this way, the squares are selected sequentially.

The invention also involves a process for playing the bingo-style game using winning patterns common to the well-known bingo game and a computer system for storing, updating and otherwise processing participant game cards. Example winning patterns include Line (L), Diagonal (D), Four Corners Postage Stamp (C), Ex (X), Half Blackout (HB), and Black Out (BO). The bingo-style game makes it particularly useful in play associated with the live sporting event using pari-mutuel betting or multiple winners. The game play continues throughout the live sporting event and is not too dependent on innings, player position& or results that are too complex, too mundane or too rare.

Most participants will easily learn when the key element delivers a defined result. It is a simple and fun way to educate participants about a key element of the live sporting event. The key element and the occurrences it creates get classified into simpler defined results promoting understanding of the live sporting event. Participants have an incentive to pay attention throughout the live sporting event. Most game cards will remain in play throughout, or near to the end of the live sporting event.

The game can be modified for play with a pseudo random number generator, a random number generator, or another method of generating a sequence of numbers and/or made to pay in a winner-take-all format. A number generator is a term of art typically used in software applications. Examples of number generators can be found in U.S. Pat. Nos. 3,688,090, 6,324,558, 8,873,750, and 9,201,629, among others. In general, a number generator provides a sequence of numbers.

Another variation of game play is to take a randomly-generated defined result from the set of defined results, i.e.—drawing a ball 1-75, and compare it to only one square at a time of the pre-populated game card grid. Since a defined result is compared to only one square-at-a-time, the set of defined results can be significantly less than the 75 or 90 of conventional bingo. The set of defined results likely comprised of eight defined results or less.

Unlike traditional bingo where the single ball identified is compared to several squares on a participant game card, the bingo-style game disclosed herein encourages the participants to be focused on one square at a time. The defined result generated by the key element is compared to only the one square in play, called the subject square. Delivering a randomly-generated defined result for comparison to a pre-populated defined result in the subject square is done sequentially, usually beginning in the upper leftmost corner of the game card, proceeding horizontally across the row through all five columns before dropping down to the leftmost column in the next row. When the twenty-five squares (5×5 grid), for example have been compared to a defined result generated by the key element, play usually returns to the upper leftmost square for comparison to the next defined result from the key element of the event.

Variations of the above sequence may utilize any square as a starting point, then move horizontally or vertically through the rows and columns, giving each square a chance to match a defined result from the key element before ending the game or starting the sequential pattern over from the initial square. The key element of the event may deliver one, two, three or even more defined results to the same square over the course of the game. Different defined results providing a mark on multiple game cards in the same square having different pre-populated defined results are equally enforceable for a winning pattern. In general, defined results do not take precedent over another defined result, and there is usually no benefit for obtaining a winning pattern sooner in the event rather than later, except a blackout winning pattern. When the defined result duplicates a previous defined result in a square, there is no effect on the game cards Once a square is marked, subsequent defined results are irrelevant and the square remains marked.

Unlike traditional bingo where each game card is generally used for one winning pattern, the pari-mutuel betting style means participants may enter several games on one game card differentiated by the winning patterns only. One game card can be played and win in six separate pattern pools. Several winners are expected in most of these pattern pools, with a pari-mutuel payout, the blackout game card serving as a jackpot game card with infrequent winners. The participant meet choose for a given game card the winning patterns they will play prior to the start of the live sporting event. The game cards remain in play as long as the key element of the event is delivering defined results.

In the bingo-style card game disclosed herein, a couple situations can draw the participant's interest until the end of the live sporting event. The blackout pattern for a jackpot win intends to make most game cards appear playable until the end of the live sporting event. More importantly, with the pari-mutuel format, participants will find they have unmarked squares nearby useful to a winning pattern. They will watch eagerly, hoping the key element will continue delivering defined results to match these unmarked squares, giving them a share of the payout. Game winning cards designated as one or more game cards exhibiting valid marks arranged on the grid of squares in a pre-determined pattern known as a winning pattern.

FIG. 1 is a table 105 of defined results for a live sporting event corresponding to a baseball game. As is known, a baseball game generally includes certain defined results that occur for a key element of the baseball game. For example, it is expected that an average baseball game has a certain set of defined results, such as walks, strikeouts, ground outs, fly outs, hits, etc. that occur for the key element. One example of the key element is the batter of the baseball game. It should be noted that the baseball game is described as being from the Major League Baseball (MLB), but the same key element and defined results can be used for college baseball, the Korean Baseball Organization (KBO), or similar.

In the first column of table 105, there is listed defined results corresponding to an out recorded (O). These include a fly out (O), ground out (O), line out (O), pop up (O), fielder's choke (O), sacrifice fly (O), sacrifice bunt (O), double play batted hall (O), triple play/batted ball (O), and infield fly rule (O), among others, all corresponding to a batter recording an out (O).

In the second column of table 105, there is listed defined results corresponding to a strike out (K, C). These include a strike out-put out (K), called strike (C), swinging strike out (K), and caught foul tip (K), among others, all corresponding to a batter recording a strikeout (K, C).

In the third column of table 105, there is listed defined results corresponding to an extra base (X, H) hit. These include a double (X), triple (X), and home run (H), among others, all corresponding to a batter recording an extra base hit (X, H).

In the fourth column of table 105, there is listed defined results corresponding to a batter reaching first base (F). These include a single (F), walk (F), hit by pitch (F), strikeout (no put out) (F), catcher's interference (F), error (F), and fielder's choice (F), among others, all corresponding to a batter making it to first base (F).

FIG. 2 is a table 107 of defined results for a live sporting event corresponding to a football game. As is known, a football game generally includes certain defined results that occur for a key element of the football game. For example, it is expected that an average football game has a certain set of defined results, such as passes, runs, touchdowns, field goals, etc. Examples of the key element is a play of the football game. Another key element might be a series of downs of the football game. It should be noted that the football game is described as being from the National Football League (NFL), but the same key element and defined results can be used for college football and the Canadian Football League (CFL), or similar.

In the first column of table 107, there is listed defined results corresponding to a first down (F, 4). These include a first down through a pass (F), run (F), penalty (F), fake punt (4), and fake field goal (4), among others, all corresponding to a player recording a first down (F, 4).

In the second column of table 107, there is listed defined results corresponding to a score (S). These include a score through a touchdown (S) and field goal (S), among others, all corresponding to a player recording a score (S).

In the third column of table 10, there is listed defined results corresponding to a possession change (C, T). These include possession change through the end of a half or game, missed 4th down conversion, missed field goal (C, T), fake punt not converted, fake field goal not converted, fumble lost (T), interception (T), safety (T), and muffed snap (C, T), among others, all corresponding to a play resulting in a possession change (C, T).

In the fourth column of table 107, there is listed defined results corresponding to punt (P). These include a blocked punt and muffed punt reception, among others, all corresponding to a play resulting in a punt (P).

FIG. 3 is an embodiment of a game card 110, wherein the game card 110 is used with the bingo-style game disclosed herein. It should be noted that the game card 110 can be an electronic game card or a printed game card. The electronic game card can be displayed by an electronic device, such as a phone, tablet, laptop computer, desktop computer, etc. The printed game card is printed on a substrate, such as a piece of paper.

In this embodiment, the game card 110 includes a card grid 111 of a plurality of squares. In FIG. 3, the squares correspond to square tiling arranged in a grid, as in a traditional bingo game. However, the squares can be different shapes and/or different size areas, if desired, such as rectangular. It should be noted that a square is sometimes referred to as a tile.

In this embodiment, the card grid 111 includes a grid of five rows and five columns (5×5) of tiles (squares). However, the card grid 111 can include a grid having a different number of rows and columns of files, such as four rows and four columns (4×4). It should be noted that the number of rows and columns can be the same or they can be different. In this way, a bingo-style game card is provided, wherein the game card has a grid of tiles formed in a plurality of rows and a plurality of columns. It should be noted that the plurality of rows and columns correspond to a collection of numbers and/or symbols arranged as a matrix.

The game card 110 includes live sporting event information 112. The live sporting event information 112 can be of many different types, such as the type of live sporting event (Major League Baseball (MLB)), the name of the teams playing (Dbacks vs. Mets), the location of the game (Citi Field), and the date of the game (Jun. 2, 2019), among other types of information. In FIG. 3, the live sporting event information 112 indicates that game card 110 is for a baseball game. Hence, the defined results correspond to occurrences of a baseball game, as discussed above with FIG. 1. When the live sporting event information 112 corresponds to a football game, the defined results correspond to occurrences of a football game, as discussed above with FIG. 2.

The game card 110 includes a at least one pre-determined winning pattern 113, which is selected by the game card player. In this embodiment, the pre-determined winning patterns 113 chosen corresponds to a Line (L), Ex (X), and Black Out (BO). In this way, the player will win if a horizontal or vertical line of five squares are marked. The marking of the squares will be discussed in more detail below. It should be noted that there are many other winning patterns that can be chosen, such as a Diagonal (D), Four CornersPostage Stamp (C), Ex (X), Half Blackout (BB), Black Out (BO), etc. Hence, the participant chooses, for a given game card, the desired winning patterns they will play prior to the start of the event.

The game card 110 includes wager information 114 about the amount wagered for this particular game card. In FIGS. 3-6, it is indicated that 512 is being wagered.

In this embodiment, the card grid 111 is delivered with a defined result one square (tile) at a time as the baseball game progresses from one batter to the next. In this way, the defined results are delivered to the card grid 111 between consecutive occurrences of the live sporting event.

For convenience, a first active tile 115 is selected as the first tile for the first batter of the baseball game, wherein the first active tile 115 is at the first row and first column of the card grid. In some situations, the second tile selected is an adjacent tile. For example, a second active tile 116 can be chosen as the second tile for the second batter of the baseball game, wherein the second active tile 116 is at the first row and second column of the card grid. It should be noted that the second batter is up after the first batter in a typical baseball game so that the first and second batters are up at different times. In this way, the first active tile is selected, then the second active tile is selected.

There is one tile that is active at any given time and this one tile is the subject square or subject tile. The subject tile can be highlighted, if desired, such as by blinking color, blinking its border, alternate shading, etc. The highlighting makes it easier for the game card player to keep track of the subject square while watching the live sporting event.

A tile is selected in response to an event. For example, the first active tile 115 is selected in response to an indication that the baseball game has started and the first batter is up. In this way, a tile is selected in response to the start of a live sporting event.

The second active tile 116 is selected in response to an indication that the second batter is up. It should be noted that the indication that the second batter is up corresponds to an indication that the first batter is no longer up. In this example, the first active tile 115 has the defined result corresponding to the first batter delivered thereto. Further, in this example, the second active tile 116 has the defined result corresponding to the second batter delivered thereto when the second batter is no longer up. It should be noted that, when there is a change in batters in a baseball game, a play is said to have occurred. In this way, a tile is selected in response to an occurrence of the live sporting event, wherein the occurrence can be a play during the live sporting event.

It should be noted that a set of defined results can be selected before the live sporting event begins. For example, the selected set of defined results is selected in response to an event, such as the beginning of the live sporting event. As mentioned above, the set of defined results typically includes four to eight defined results. For example, one set can include the set of out recorded (O), strikeout (K), extra bases (X), and on first (F). Another set can include the set of out recorded (O), strikeout (K), called strike (C), extra bases (X), home run (H), and on first (F).

In other situations, the set of pre-populated defined results is chosen by a computer. The defined results from the set of defined results can be displayed by the card grid 111 before the live sporting event starts. In other situations, the tiles of the card grid 111 allow the player to enter the defined results as the corresponding tile becomes the subject tile.

Figure 4:
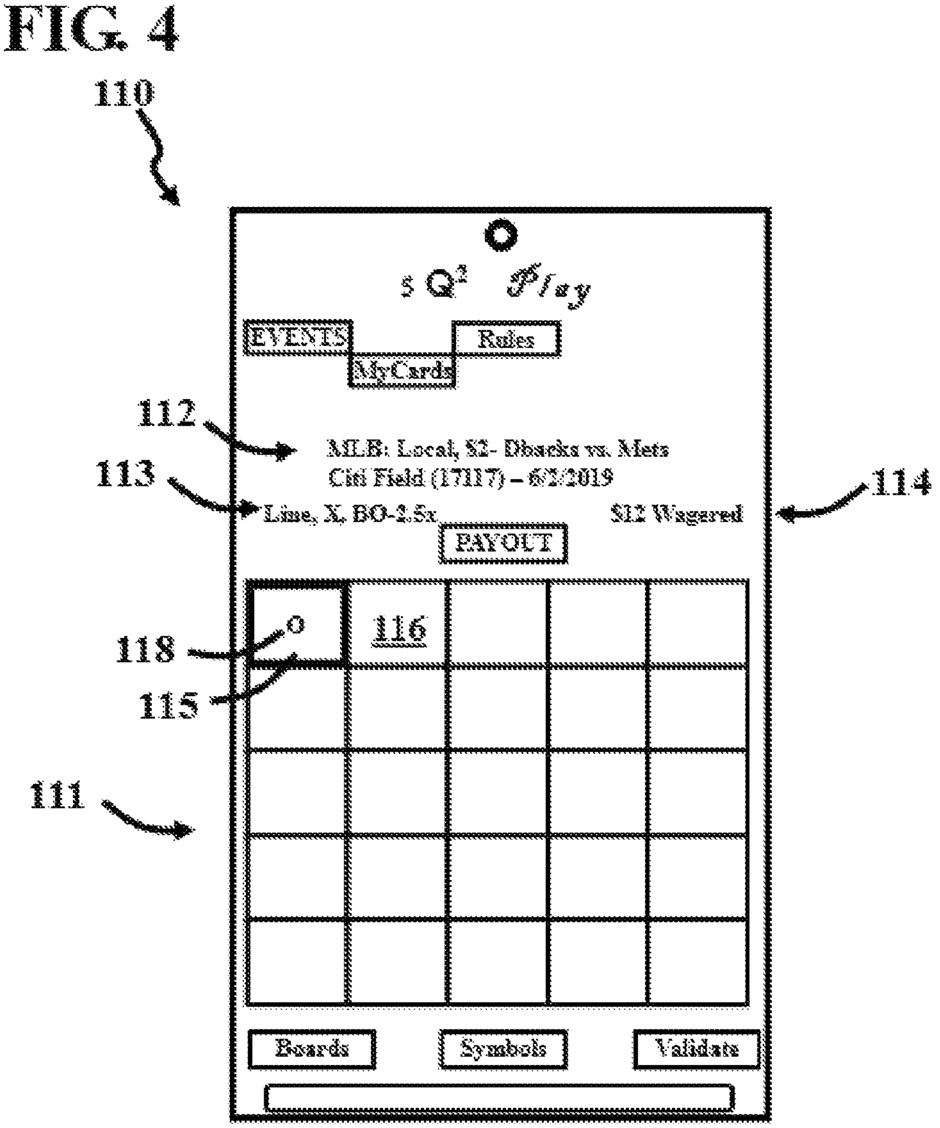
FIG. 4 is a view of the game card of FIG. 3, wherein a pre-populated defined result 118 has been displayed in a first active tile.

FIG. 4 is a view of the game card 110 of FIG. 3, wherein a pre-populated defined result 118 has been displayed in the first active tile 115. In this example, the pre-populated defined result 118 is an out recorded (O), as shown in FIG. 1. It should be noted, however, that the pre-populated defined result 118 can be one of the other defined results of FIG. 1. In some embodiments, the game card player selects the pre-populated defined result 118. In other embodiments, the pre-populated defined result 118 is selected by a computer so the game card 110 is pre-populated. In this way, the pre-populated defined result 118 is selected from a set of defined results.

As mentioned above, a baseball game generally includes certain defined results that occur. For example, it is expected that an average baseball game has a certain number of defined results, such as walks, strikeouts, ground outs, fly outs, hits, etc. The computer can select the defined results based on these percentages or the computer can select the defined results based on an algorithm. In this way, the pre-populated defined result 118 is selected by a computer from among a plurality of defined results.

As mentioned above, the game card 110 can be used with other live sporting events, football, hockey, soccer, basketball, etc. FIG. 2 shows defined results that correspond to a football game. Hence, in general, the pre-populated defined result is selected from possible defined results of the corresponding live sporting event.

Figure 5:
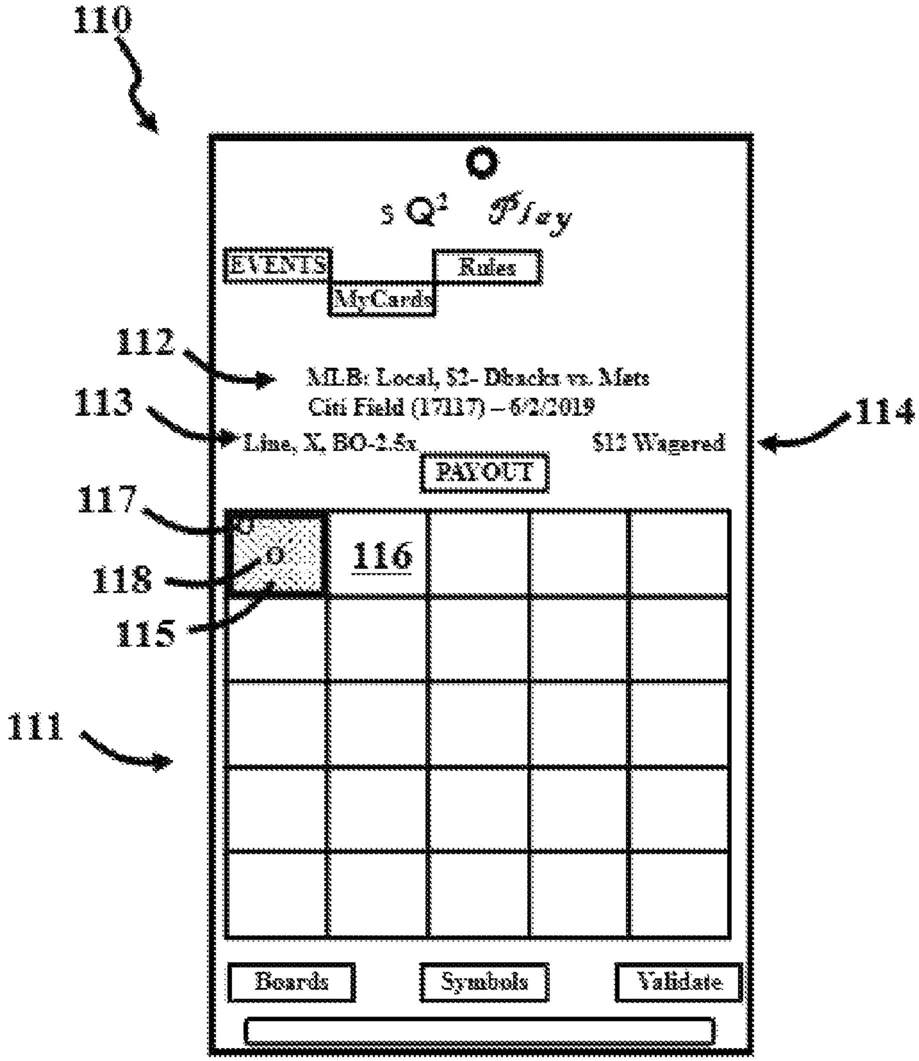
FIG. 5 is a view of the game card of FIG. 4, wherein a delivered defined result is displayed in the first active tile with the pre-populated defined result.

FIG. 5 is a view of the game card 110 of FIG. 4, wherein a delivered defined result 117 is displayed in the first active tile 115 with the pre-populated defined result 118. The delivered defined result 117 is displayed in the first active tile 115 in response to an indication that a play has occurred. The delivered defined result 117 corresponds to the outcome of the play in the live sporting event. In this example, the outcome of the play is indicated to be a recorded out (O), as shown in column 1 of FIG. 1. The delivered defined result 117 would correspond to a strikeout (K, C) if the outcome of the play had been a strikeout, as indicated in column 2 of FIG. 1. Further, the delivered defined result 117 would correspond to extra bases (X, H) if the outcome of the play had been an extra base hit, as indicated in column 3 of FIG. 1. The delivered defined result 117 would correspond to on first (F) if the outcome of the play had been the batter reaching first base, as indicated in column 4 of FIG. 1.

It should be noted that the delivered defined result 117 and the pre-populated defined result 113 can be displayed at many different locations in the first active tile 115. In FIG. 5, the delivered defined result 117 is displayed towards the upper portion of the first active tile 115 and the pre-populated defined result 118 is displayed towards the center of the first active tile 115 for illustrative purposes. The same positioning is used throughout the other tiles of card grid 111.

As mentioned above, the delivered defined result 117 and the pre-populated defined result 118 are compared in the one square currently in play, called the subject square or subject tile. The first active tile 115 is marked in response to an indication that the delivered defined result 117 and pre-populated defined result 118 match. The delivered defined result 117 and pre-populated defined result 118 match when they are the same. The delivered defined result 117 and pre-populated defined result 118 do not match when they are not the same.

In FIG. 5, the delivered defined result 117 and pre-populated defined result 118 are both recorded outs so that they match. In this way, the delivered defined result 117 of the live sporting event is compared to the pre-populated defined result 118 of the selected tile, which is the first active tile 115 in FIG. 5.

The first active tile 115 can be marked in many different ways in response to an indication of a match. For example, the first active tile 115 can be marked with a marker, such as a pen, pencil, and/or bingo dauber when the game card 110 is printed on paper. The first active tile 115 can be marked in many different ways when the game card 110 is an electronic game card. For example, the first active tile 115 can be given a color, shading, pattern, or some other visual indication that the delivered defined result 117 and pre-populated defined result 118 match. In FIG. 5, the marking is a pattern of stippled dots for illustrative purposes.

Figure 6:
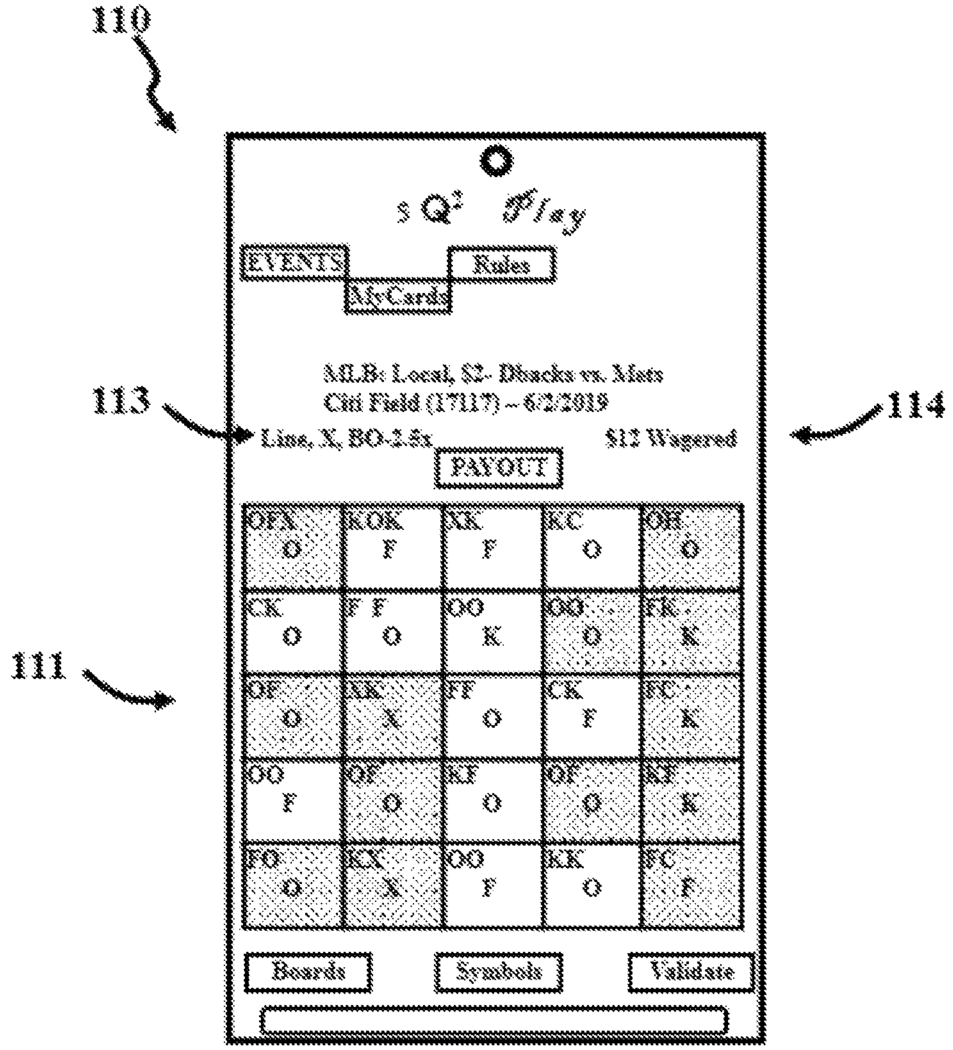
FIG. 6 is a view of the game card, wherein many plays have occurred so that the card grid displays a plurality of delivered defined results and pre-populated defined results.

FIG. 6 is a view of the game card 110, wherein many plays have occurred so that the card grid 111 displays a plurality of delivered defined results and pre-populated defined results. The tiles of the card grid 111 are marked if the corresponding delivered defined result and pre-populated defined results match. In FIG. 6, it can be seen that the fifth column of the card grid 111 is fully marked so that a line is formed. The fifth column is fully marked because each tile in that column includes matching delivered defined results and pre-populated defined results. As discussed above with HG. 3, pre-determined winning pattern 113 indicates that the game card player chose a line for a winning pattern so that the game card 110 is a winner. If the game card 110 did not include a fully marked row or column, then it would be considered a loser and would not pay out.

It should be noted that, during normal game play, the subject square moves through the card grid from left to right and from top to bottom. Hence, when the subject square is the square at row five and column five, it will subsequently move to column one and row one, wherein the pattern will repeat. The subject square will sometimes move through the card grid 111 a plurality of times so that some squares can include a plurality of defined results, as shown in FIG. 6. In general, the number of times that a square will be a subject square depends on the number of occurrences in the live sporting event, wherein each play or a set or series of plays corresponds to an occurrence of the live sporting event.

For example, the square at row three and column two indicates that it has been the subject square twice because it displays two delivered defined results 117, X and K. The square at row three and column two is marked because it displays the pre-populated defined results 118 of X which matches at least one of the delivered defined results 117.

In another example, the square at row one and column two indicates that it has been the subject square three times because it displays three delivered defined results 117, K, O and K. The square at row one and column two is not marked because it displays the pre-populated defined result 118 of which does not match at least one of the delivered defined results 117. In this way, each tile can be selected one or more times during a single live sporting event.

As can be appreciated, it is desirable to have a group of game card players so that the game play is more sociable and people can enjoy watching the live sporting event together. The people can be at a private residence or at a sports bar, for example. Hence, it is desirable to be able to provide a plurality of game cards. To make game play competitive, it is desirable to have only a few winners and many close games. It is also desirable to have the game last the duration of the live sporting event. As such, it is desirable to provide a plurality of cards that have a different chance of winning.

Figure 7:
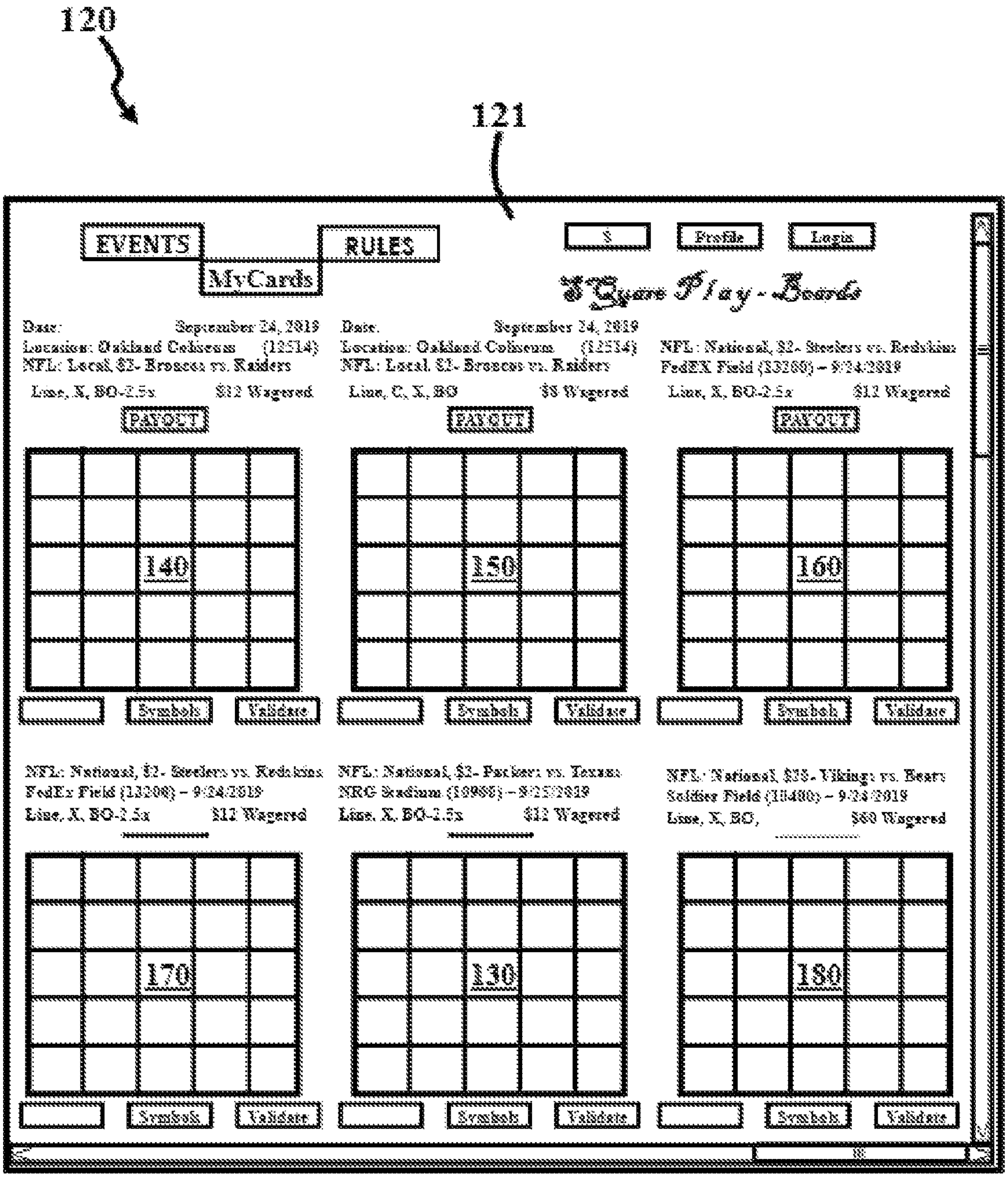
FIG. 7 is a view of a plurality of electronic game cards displayed on a display screen, wherein the electronic game cards are shown in FIGS. 8, 9, 10, 11, 12, and 13.

FIG. 7 is a view of a plurality of electronic game cards 120 displayed on a display screen 121. It should be noted that the plurality of electronic game cards 120 can be on the same display screen 121 or they can each be on a different display screen 121. Further, one or more electronic game cards 120 can be on different display screens 121. The plurality of electronic game cards 120 are shown on the same display screen 121 in FIG. 7 for illustrative purposes. The display screen 121 can be of many different types, such as a computer display screen or a tablet. In this embodiment, the plurality of electronic game cards 120 includes game cards 130, 140, 150, 160, 170, and 180.

Figure 8:
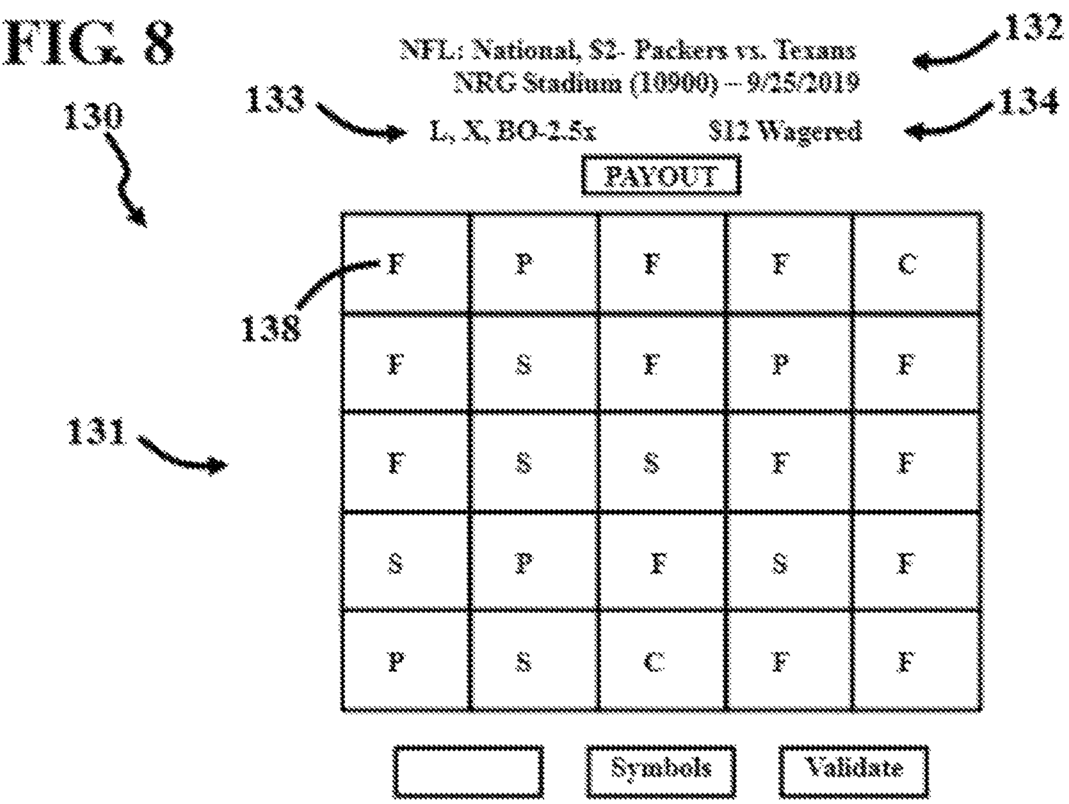
FIG. 8 is a view of a first game card of FIG. 7.

FIG. 8 is a view of the game card 130 of FIG. 7. In this embodiment the game card 130 includes a card grid 131 of a plurality of tiles. An example card grid is discussed in more detail above with FIGS. 3-6.

In this embodiment, the game card 130 includes live sporting event information 132. The live sporting event information 132 can be of many different types, such as the type of live sporting event (National Football League (NFL)), the name of the teams playing (Packers vs. Texans), the location of the game (NRG Stadium), and the date of the game (Sep. 25, 2019), among other types of information.

The game card 130 includes wager information 134 about the amount wagered for this particular game card. In FIG. 8, it is indicated that $12 is being wagered.

In FIG. 8, the live sporting event information 132 indicates that the game card 130 is for a football game. Hence, the defined results correspond to occurrences of a football game, as discussed above with FIG. 2. When the live sporting event information 132 corresponds to a baseball game, the defined results correspond to occurrences of a baseball game, as discussed above with FIG. 1.

The game card 130 includes a pre-determined winning pattern 133, which is selected by the game card player. In this embodiment, the pre-determined winning pattern 133 corresponds to a Line (L), Ex (X), and Black Out (BO). In this way, the player will win if a any of these three patterns are marked. It should be noted that there are many other winning patterns that can be chosen, such as a Diagonal (D), Four Corners'Postage Stamp (C), Half Blackout (HB), etc. Hence, the participant chooses, for a given game card, the desired winning patterns they will play prior to the start of the event.

In FIG. 8, the card grid 131 does not include an active square or tile which is currently in play because the live sporting event has not started. Hence, the squares or tiles of the card grid 131 are not marked or shaded.

In FIG. 8, the card grid 131 includes pre-populated defined results 138 in each square, wherein the pre-populated defined results 138 are displayed in the card grid 131 before the live sporting event starts. Because the live sporting event has not started in FIG. 8 there are no delivered defined results displayed in the card grid 131.

Figure 9:
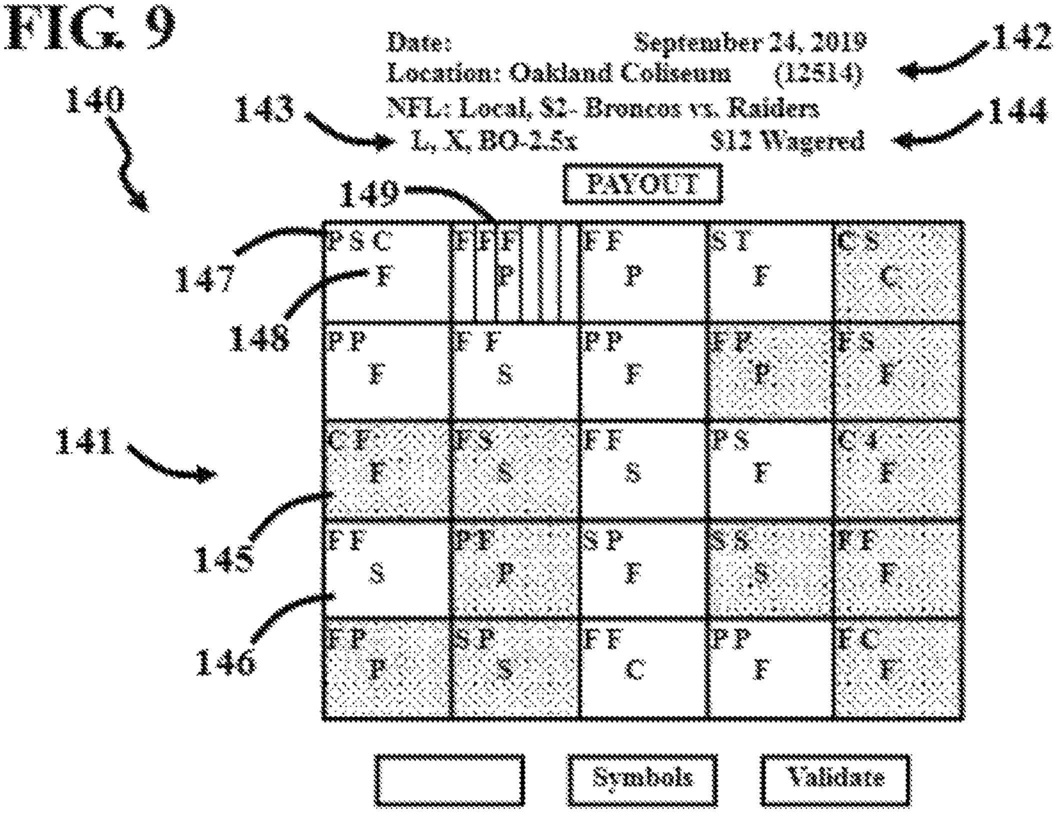
FIG. 9 is a view of a second game card of FIG. 7.

FIG. 9 is a view of the game card 140 of FIG. 7. In this embodiment, the game card 140 includes a card grid 141 of a plurality of tiles. An example card grid is discussed in more detail above with FIGS. 3-6.

In this embodiment, the game card 140 includes live sporting event information 142. The live sporting event information 142 can be of many different types, such as the type of live sporting event (National Football League (NFL)), the name of the teams playing (Broncos vs. Raiders), the location of the game (Oakland Coliseum), and the date of the game (Sep. 24, 2019), among other types of information.

The game card 140 includes wager information 144 about the amount wagered for this particular game card. In FIG. 9, it is indicated that 512 is being wagered.

In FIG. 9, the live sporting event information 142 indicates that game card 140 is for a football game. Hence, the defined results correspond to occurrences of a football game, as discussed above with FIG. 2. When the live sporting event information 142 corresponds to a baseball game, the defined results correspond to occurrences of a baseball game, as discussed above with FIG. 1.

The game card 140 includes a pre-determined winning pattern 143, which is selected b the game card player. In this embodiment, the pre-determined winning pattern 143 corresponds to a Line (L), Ex (X), and Black Out (BO). In this way, the player will win if a any of these three patterns are marked. It should be noted that there are many other winning patterns that can be chosen, such as a Diagonal (D), Four Corners Postage Stamp (C), Half Blackout (HB), etc. Hence, the participant chooses, for a given game card, the desired winning patterns they will play prior to the start of the event.

In FIG. 9, the card grid 141 includes pre-populated defined results 148 in each square, wherein the pre-populated defined results 143 are displayed in the card grid 141 before the live sporting event starts. Because the live sporting event has started in FIG. 9, there are delivered defined results 147 displayed in the card grid 141.

In FIG. 9, the card grid 141 includes an active square or tile 149, which is currently in play. For illustrative purposes, the active square or tile 149 is shown to include vertical lines for ease of reference. As shown, the active square or tile 149 is not otherwise marked or shaded because the pre-populated defined result 148 and delivered defined results 147 do not match.

Some of the squares or tiles in the card grid 141 are rnarked or shaded because the corresponding pre-populated defined results 148 and delivered defined results 147 do match One example of a marked or shaded square is denoted as square or tile 145, wherein the pre-populated defined result (F) matches one of the delivered defined results (C, F) of the corresponding square or tile 145.

Some of the squares or tiles in the card grid 141 are not marked or shaded because the corresponding pre-populated defined results 148 and delivered defined results 147 do not match. One example of an unmarked or unshaded square is denoted as square or tile 146, wherein the Fe-populated defined result (S) does not match the delivered defined results (F, F) of the corresponding square or tile 146.

Figure 10:
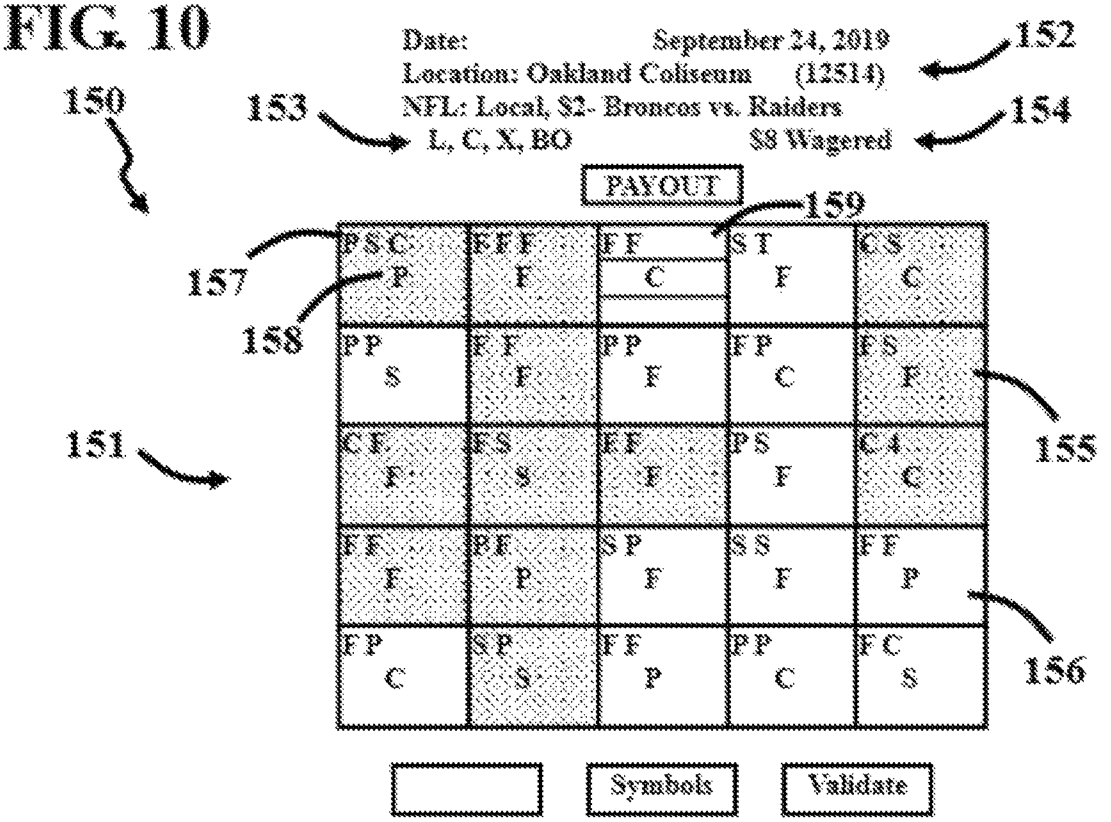
FIG. 10 is a view of a third game card of FIG. 7.

FIG. 10 is a view of the game card 150 of FIG. 7. In this embodiment, the game card 150 includes a card grid 151 of a plurality of tiles. An example card grid is discussed in more detail above with FIGS. 3-4.

In this embodiment, the game card 150 includes live sporting event information 152. The live sporting event information 152 can be of many different types, such as the type of live sporting event (National Football League (NFL)), the name of the teams playing (Broncos vs. Raiders), the location of the game (Oakland Coliseum), and the date of the game (Sep. 24, 2019), among other types of information.

The game card 150 includes wager information 154 about the amount wagered for this particular game card. In FIG. 10, it is indicated that $8 is being wagered.

In FIG. 10, the live sporting event information 152 indicates that the game card 150 is for a football game. Hence, the defined results correspond to occurrences of a football game, as discussed above with FIG. 2. When the live sporting event information 152 corresponds to a baseball game, the defined results correspond to occurrences of a baseball game, as discussed above with FIG. 1.

The game card 150 includes a pre-determined winning pattern 153, which is selected by the game card player. In this embodiment, the pre-determined winning pattern 153 corresponds to a Line (L), Four Corners Postage Stamp (C), Ex (X), and Black Out (BO). In this way, the player will win if a any of these three patterns are marked. It should be noted that there are many other Winning patterns that can be chosen, such as a Diagonal (D), Half Blackout (HB), etc. Hence, the participant chooses, for a given game card, the desired winning patterns they will play prior to the start of the event.

In FIG. 10, the card grid 151 includes pre-populated defined results 158 in each square, wherein the pre-populated defined results 158 are displayed in the card grid 151 before the live sporting event starts. Because the live sporting event has started in FIG. 10, there are delivered defined results 157 displayed in the card grid 151.

In FIG. 10, the card grid 151 includes an active square or tile 159, which is currently in play. For illustrative purposes, the active square or tile 159 is shown to include horizontal lines for ease of reference. As shown, the active square or tile 159 is not otherwise marked or shaded because the pre-populated defined result 158 and delivered defined results 157 do not match.

Some of the squares or tiles in the card grid 151 are marked or shaded because the corresponding pre-populated defined results 158 and delivered defined results 157 do match. One example of a marked or shaded square is denoted as square or tile 155, wherein the pre-populated defined result (F) matches one of the delivered defined results (F, S) of the corresponding square or tile 155.

Some of the squares or tiles in the card grid 151 are not marked or shaded because the corresponding pre-populated defined results 158 and delivered defined results 157 do not match. One example of an unmarked or unshaded square is denoted as square or tile 156, wherein the pre-populated defined result (P) does not match one of the delivered defined results (F, F) of the corresponding square or tile 156.

Figure 11:
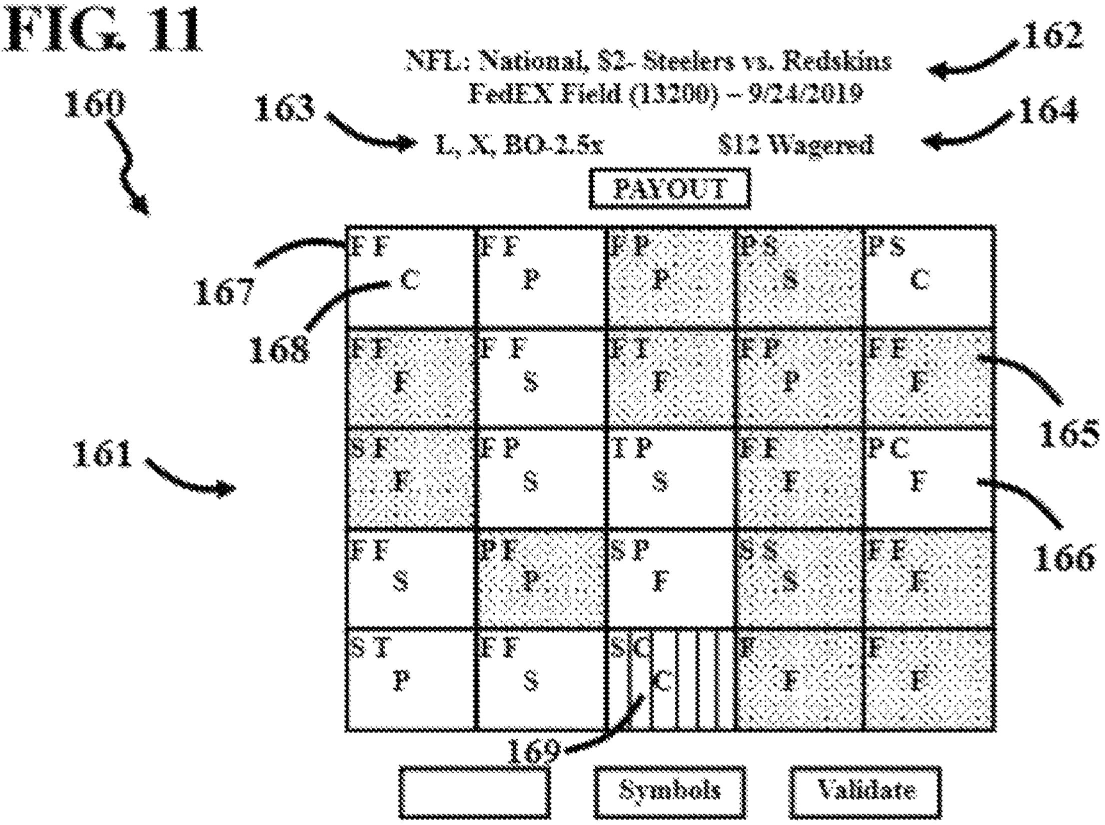
FIG. 11 is a view of a fourth game card of FIG. 7.

FIG. 11 is a view of the game card 160 of FIG. 7. In this embodiment, the game card 160 includes a card grid 161 of a plurality of tiles. An example card grid is discussed in more detail above with FIGS. 3-6.

In this embodiment, the game card 160 includes live sporting event information 162. The live sporting event information 162 can be of many different types, such as the type of live sporting event (National Football League (NFL)), the name of the teams playing (Steelers vs. Redskins), the location of the game (FedEx Field), and the date of the game (Sep. 24, 2019), among other types of information.

The game card 160 includes wager information 164 about the amount wagered for this particular game card. In FIG. 11, it is indicated that $12 is being wagered.

In FIG. 11, the live sporting event information 162 indicates that game card 160 is for a football game Hence, the defined results correspond to occurrences of a football game, as discussed above with FIG. 2. When the live sporting event information 162 corresponds to a baseball game, the defined results correspond to occurrences of a baseball game, as discussed above with FIG. 1.

The game card 160 includes a pre-determined winning pattern 163, which is selected by the game card player. In this embodiment, the pre-determined winning pattern 163 corresponds to a Line (L), Ex (X), and Black Out (BO). In this way, the player will win if a any of these three patterns are marked. It should be noted that there are many other winning patterns that can be chosen, such as a Diagonal (D), Four CornersPostage Stamp (C), Half Blackout (HB), etc. Hence, the participant chooses, for a given game card, the desired winning patterns they will play prior to the start of the event.

In FIG. 11, the card grid 161 includes pre-populated defined results 168 in each square, wherein the pre-populated defined results 163 are displayed in the card grid 161 before the live sporting event starts. Because the live sporting event has started in FIG. 10, there are delivered defined results 167 displayed in the card grid 161.

In FIG. 11, the card grid 161 includes an active square or tile 169, which is currently in play. For illustrative purposes, the active square or tile 169 is shown to include vertical lines for ease of reference. As shown, the active square or tile 169 is currently being marked or shaded because the pre-populated defined result 168 and the live delivered defined result 167 just made a match.

Some of the squares or tiles in the card grid 161 are marked or shaded because the corresponding pre-populated defined results 165 and delivered defined results 167 do match. One example of a marked or shaded square is denoted as square or tile 165, wherein the pre-populated defined result (F) matches at least one of the delivered defined results (F, F) of the corresponding square or tile 165.

Some of the squares or tiles in the card grid 161 are not marked or shaded because the corresponding pre-populated defined results 165 and delivered defined results 167 do not match. One example of an unmarked or unshaded square is denoted as square or tile 166, wherein the pre-populated defined result (F) does not match either of the delivered defined results (P, C) of the corresponding square or tile 166.

Figure 12:
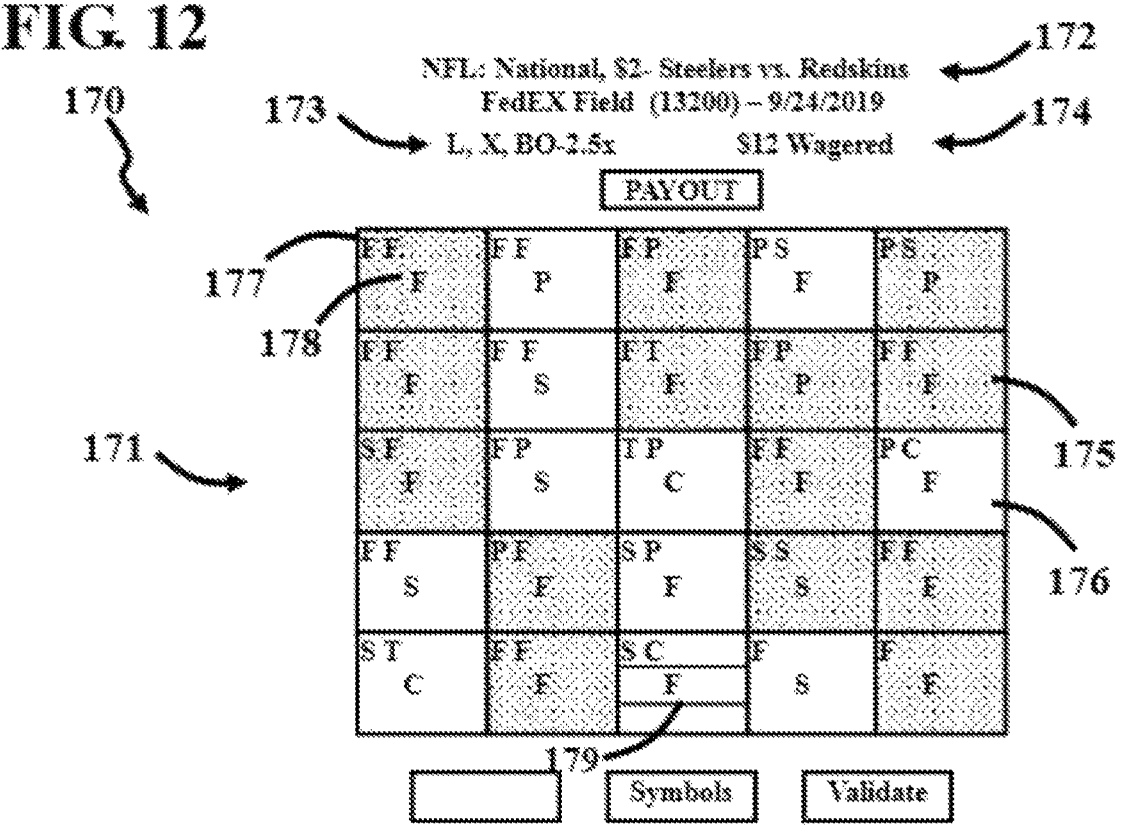
FIG. 12 is a view of a fifth game card of FIG. 7.

FIG. 12 is a view of the game card 170 of FIG. 7. In this embodiment, the game card 170 includes a card grid 171 of a plurality of tiles. An example card grid is discussed in more detail above with FIGS. 3-6.

In this embodiment, the game card 170 includes live sporting event information 172. The live sporting event information 172 can be of many different types, such as the type of live sporting event (National Football League (NFL)), the name of the teams playing (Steelers vs. Redskins), the location of the game (FedEx Field), and the date of the game (Sep. 24, 2019), among other types of information.

The game card 170 includes wager information 174 about the amount wagered for this particular game card. In FIG. 12, it is indicated that $12 is being wagered.

In FIG. 12, the live sporting event information 172 indicates that the game card 170 is for a football game. Hence, the defined results correspond to occurrences of a football game, as discussed above with FIG. 2. When the live sporting event information 172 corresponds to a baseball game, the defined results correspond to occurrences of a baseball game, as discussed above with FIG. 1.

The game card 170 includes a pre-determined winning pattern 173, which is selected by the game card player. In this embodiment, the pre-determined winning pattern 173 corresponds to a Line (L), Ex (X), and Black Out (BO). In this way, the player will win if a any of these three patterns are marked. It should be noted that there are many other winning patterns that can be chosen, such as a Diagonal (D), Four CornersPostage Stamp (C), Half Blackout (BB), etc. Hence, the participant chooses, for a given game card, the desired winning patterns they will play prior to the start of the event.

In FIG. 12, the card grid 171 includes pre-populated defined results 178 in each square, wherein the pre-populated defined results 178 are displayed in the card and 171 before the live sporting event starts. Because the live sporting event has started in FIG. 12, there are delivered defined results 177 displayed in the card grid 171.

In FIG. 12, the card grid 171 includes an active square or tile 179, which is currently in play. For illustrative purposes, the active square or tile 179 is shown to include horizontal lines for ease of reference. As shown, the active square or tile 179 is not otherwise marked or shaded because the pre-populated defined result 178 and delivered defined results 177 do not match.

Some of the squares or tiles in the card grid 171 are marked or shaded because the corresponding pre-populated defined results 178 and delivered defined results 177 do match. One example of a marked or shaded square is denoted as square or tile 175, wherein the pre-populated defined result (F) matches the delivered defined results (F, F) of the corresponding square or tile 175.

Some of the squares or tiles in the card grid 171 are not marked or shaded because the corresponding pre-populated defined results 178 and delivered defined results 177 do not match. One example of an unmarked or unshaded square is denoted as square or tile 176, wherein the pre-populated defined result (F) does not match the delivered defined results (P, C) of the corresponding square or tile 176.

Figure 13:
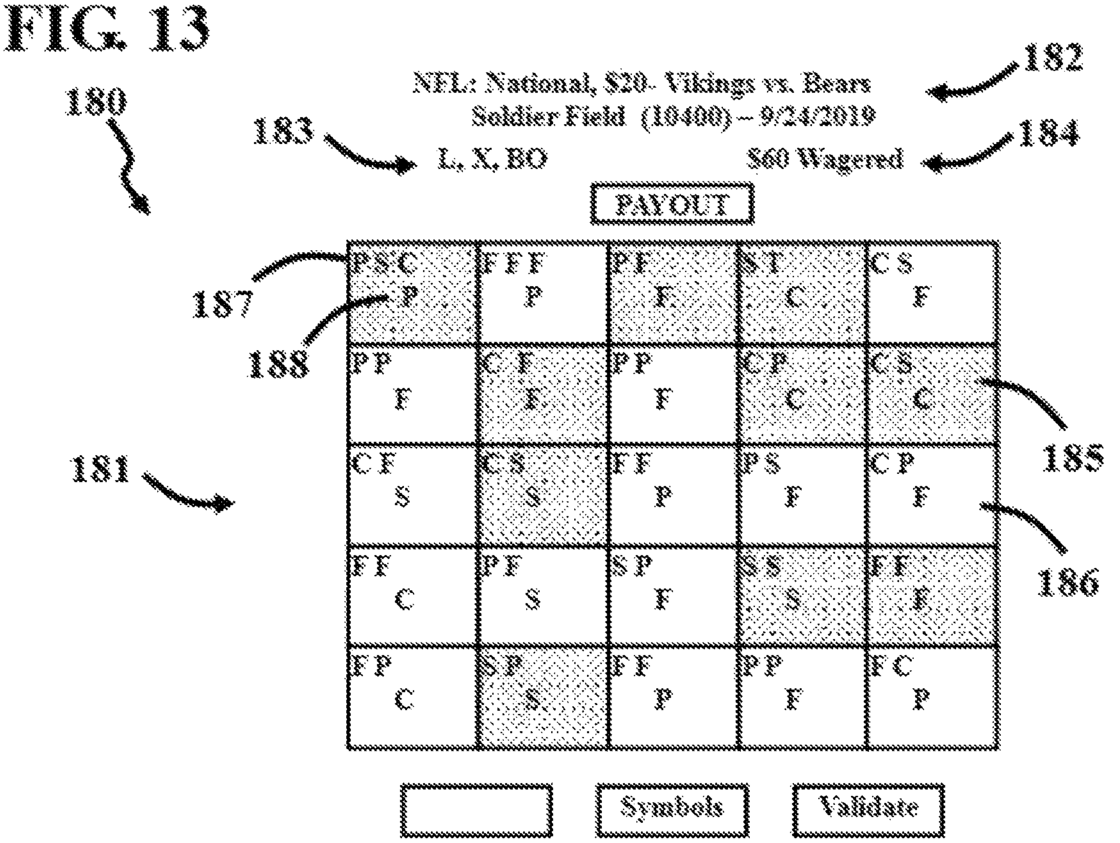
FIG. 13 is a view of a sixth game card of FIG. 7.

FIG. 13 is a view of the game card 180 of FIG. 7. In this embodiment, the game card 180 includes a card grid 181 of a plurality of tiles. An example card grid is discussed in more detail above with FIGS. 3-6.

In this embodiment, the game card 180 includes live sporting event information 132. The live sporting event information 182 can be of many different types, such as the type of live sporting event (National Football League (NFL)), the name of the teams playing (Vikings vs. Bears), the location of the game (Soldier Field), and the date of the game (Sep. 24, 2019), anon other types of information.

The game card 180 includes wager information 184 about the amount wagered for this particular game card. In FIG. 13, it is indicated that $60 is being wagered.

In FIG. 13, the live sporting event information 182 indicates that the game card 130 is for a football game. Hence, the defined results correspond to occurrences of a football game, as discussed above with FIG. 2. When the live sporting event information 182 corresponds to a baseball game, the defined results correspond to occurrences of a baseball game, as discussed above with FIG. 1.

The game card 180 includes a pre-determined winning pattern 133, which is selected by the game card player. In this embodiment, the pre-determined winning pattern 183 corresponds to a Line (L), Ex (X), and Black Out (BO). In this way, the player will win if any of these three patterns are marked. It should be noted that there are many other winnings patterns that can be chosen, such as a Diagonal (D), Four Corners Postage Stamp (C), Half Blackout (HB), etc. Hence, the participant chooses, for a given game card, the desired winning patterns they will play prior to the start of the event.

In FIG. 13, the card grid 181 includes pre-populated defined results 188 in each square, wherein the pre-populated defined results 188 are displayed in the card grid 161 before the live sporting event starts. Because the live sporting event has started in FIG. 13, there are delivered defined results 187 displayed in the card grid 181.

In FIG. 13, the card grid 181 does not include an active square or tile because the live sporting event has ended. Hence, the marked and shaded squares have been chosen for this game.

Some of the squares or tiles in the card grid 181 are marked or shaded because the corresponding pre-populated defined results 188 and delivered defined results 187 do match. One example of a marked or shaded square is denoted as square or tile 185, wherein the pre-populated defined result (C) matches one of the delivered defined results (C, S) of the corresponding square or tile 185.

Some of the squares or tiles in the card grid 151 are not marked or shaded because the corresponding pre-populated defined results 188 and delivered defined results 187 do not match. One example of an unmarked or unshaded square is denoted as square or tile 136, wherein the pre-populated defined result (F) does not match any of the delivered defined results (C, P) of the corresponding square or tile 186.

Figure 14:
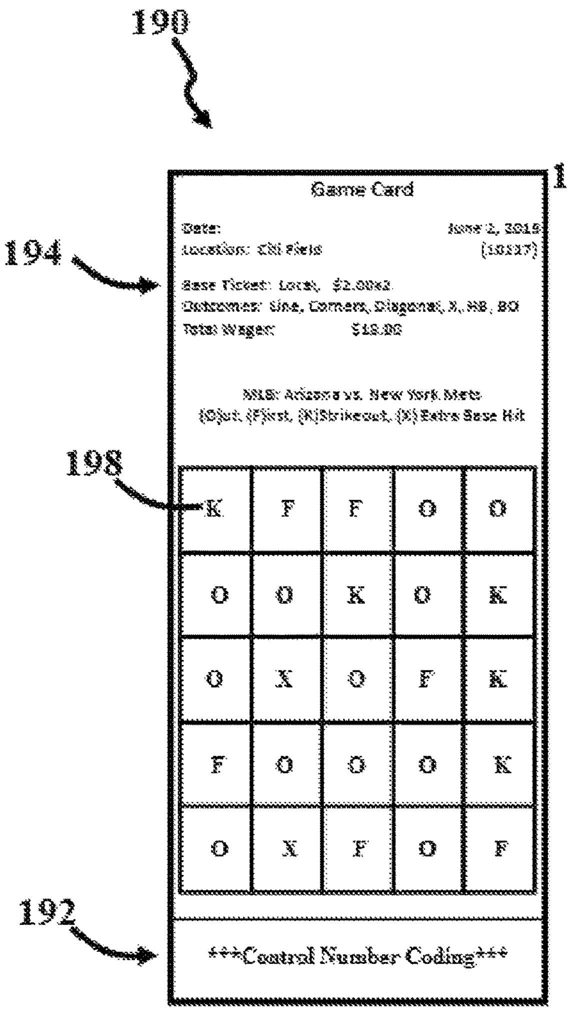
FIGS. 14 and 15 are examples of first and second paper game cards, respectively.
Figure 15:
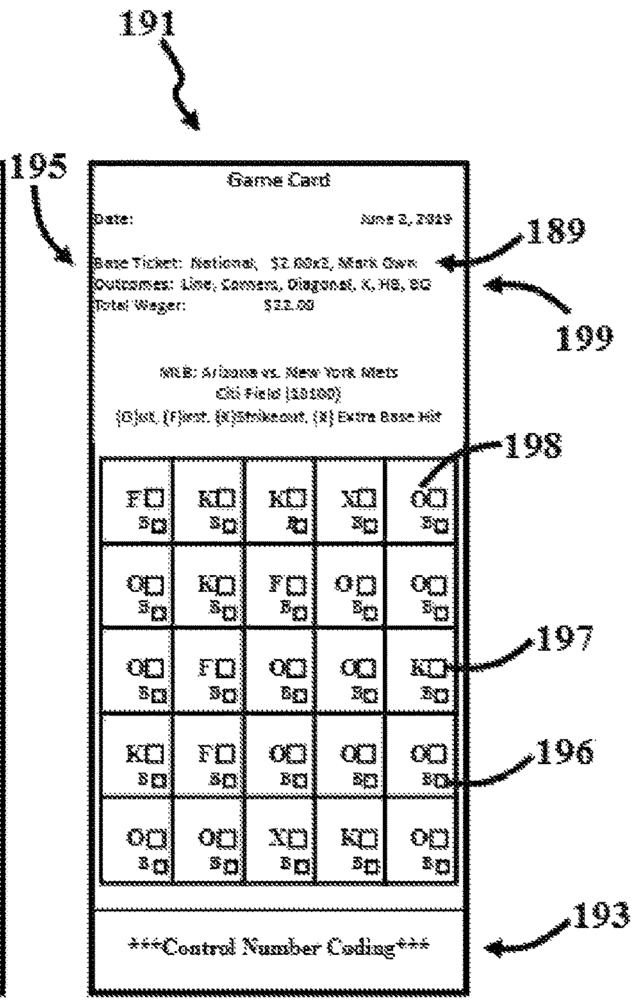

FIGS. 14 and 15 are examples of paper game cards 190 and 191, respectively. In FIG. 14, the paper game card 190 is for a local event 194 and, in FIG. 15, the paper game card 191 is for a national event 195. Since no marks on the paper game card 190 will matter, except disfiguring the control numbers, the game area may be marked up any way desired. For the paper game card 191, there is an option for selecting a Mark Your Own feature. The paper game cards 190 and 191 can be validated using the unique secure control numbers 192 and 193, respectively.

The paper game cards 190 and 191 can be printed on paper stock or they can be broadcast views of a centrally-processed image of the corresponding paper game card. Other advantages of this centrally-processed image, besides participants being available to watch the event, are the consistent results between all the games tied to the same event, faster updates of the game cards and less opportunity for mechanical or electrical failures to disrupt the results of the game. Central-processing includes monitoring the game specialist input of the randomly-generated defined result, marking the game cards when a randomly-generated defined result matches the pre-populated defined result, identifying when pre-determined winning patterns are formed, recording the time a pre-determined winning pattern was formed, calculating payouts, notifying winners and crediting participant accounts.

The generation of the paper game cards 190 and 191 has the same interactive process for generating the electronic game cards. At a kiosk, using a paper betting slip or a program of key-entered selections, a participant selects among several criteria. A control question allows a participant to obtain a paper game card, electronic game card, or both. If an electronic game card is desired, the participant is asked to enter identifying information, such as a phone number, email address, or customer account number identifying an electronic device. The participant can generate electronic game cards through the same selection of criteria on a mobile phone, computer, tablet or similar electronic device.

The paper game cards 190 and 191 generally do not provide the details available to electronic game cards, such as the location of the subject square and the randomly-generated defined results from each prior round. However, the paper game cards 190 and 191 will still have the corresponding unique secure control numbers 192 and 193 imprinted on them for identification to central processing. Through central processing, without marking anything, a participant can go to a kiosk, online, customer service machine or hand-held customer service unit to validate their corresponding paper game card. For a time specified in the game rules, the control numbers of any game card can be entered at a website or at the kiosks for validation and instructions for claiming any win or winnings.

However, if the Mark Your Own feature 189 is enabled, “Mark Own” will print on the paper game card 191, as shown in FIG. 15. Using this feature, the participant can fill the card out appropriately to win. A Fail Safe mode allows the participant to mark their own card, but not lose, if they mark it wrong. Marking the game card appropriately allows the participant to darken, i.e. mark, the defined result match box 197 inside a square when a randomly-generated defined result matches the pre-populated defined result 198 of the paper game card 191.

Additionally, the participant can mark the smaller Winning Pattern notification box 196, labeled B, in the square completing a pre-determined winning pattern 199. The paper or electronic game card, in a Mark Your Own instance, will be compared to the network-maintained game card to validate both the proper squares for a Winning Pattern and the Winning Pattern notification box 196 are correct and marked by the participant.

An incorrectly marked, but otherwise winning, game card will return a no win result when validated A results ticket can be printed at the conclusion of a game by any participant. Using a FailSafe mode enables central processing to validate the game card and notify the participant how the game card was incorrectly marked, giving instructions for claiming any win or winnings. More information regarding generating paper and/or electronic game cards will be discussed in more detail presently with FIG. 16.

Figure 16:
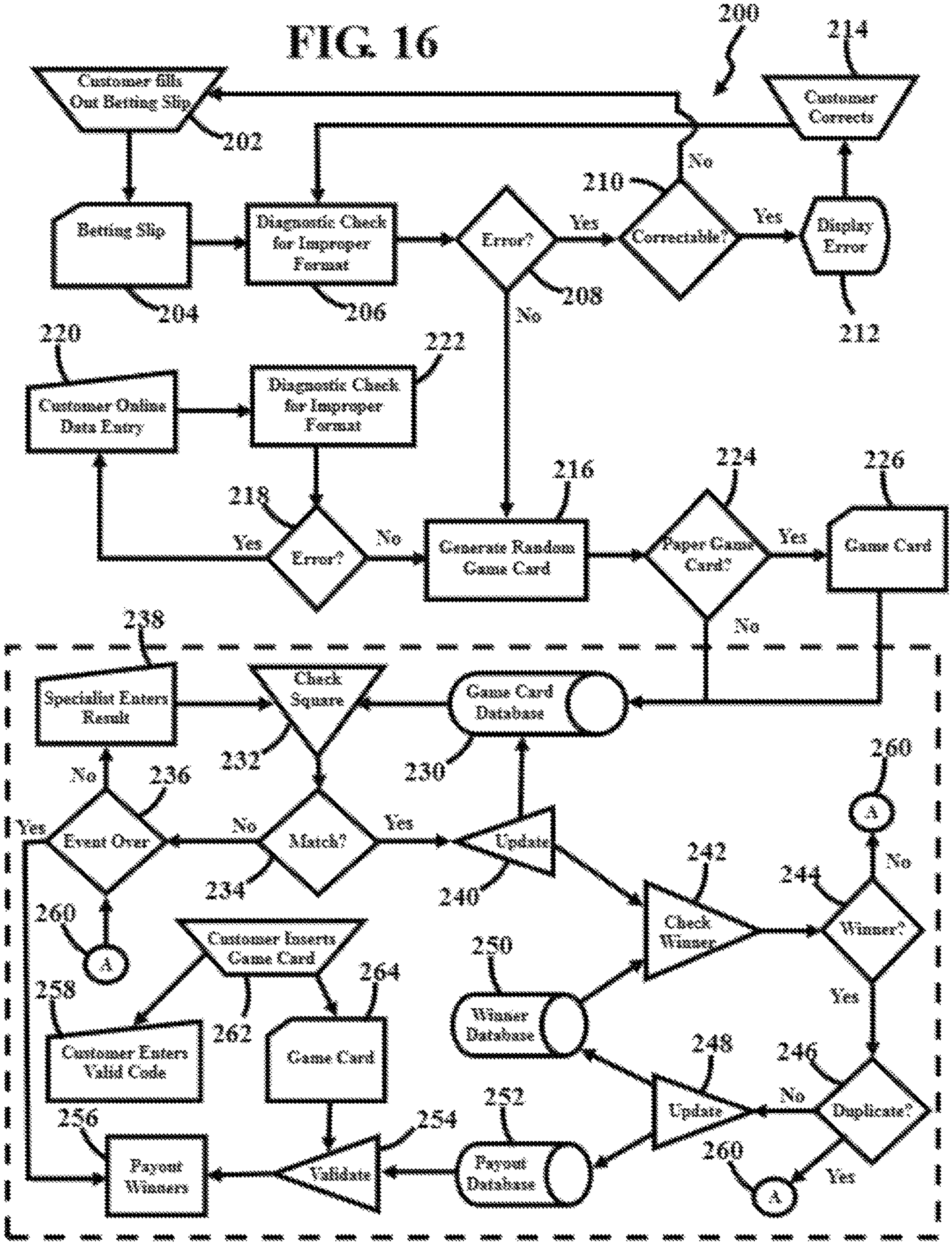
FIG. 16 is a flow diagram of one embodiment of a bingo-style game.

FIG. 16 is a flow diagram 200 of one embodiment of a bingo-style game. It should be noted that the flow diagram 200 corresponds to steps of a method of implementing one embodiment of the bingo-style card game. The steps of the method can be implemented in many different ways, such as by using a centrally processed computer network. The computer network can be of many different types and generally includes one or more network computers. The network computers can be in communication with one or more local or remote computers that operate the bingo-style game. The network computers and/or local and remote computers can be in communication with one or more electronic devices, such as a tablet, smart phone, etc.

The flow diagram 200 includes a step 202 of a customer filling out a betting slip 204. The customer is typically the game card player who will watch the sporting event and fill out the game card. Example game cards are discussed in more detail above with FIGS. 3-13. The betting slip can be filled out in many different ways. In this situation, the betting slip is a paper betting slip, which is marked by the customer. In an embodiment discussed below, the betting slip is an electronic betting slip that is displayed by a display device and fitted out electronically.

The flow diagram 200 includes a step 206 of diagnostically checking that the paper betting slip 204 is in the proper format. The paper betting slip 204 can be diagnostically checked in the step 206 in many different ways, such as b; scanning it into a kiosk that checks its format. In a step 208, control is sent to a step 210 to determine if an error is correctable. If the error is not correctable, then control is sent to the step 202 so that the customer can fill out another paper betting slip that is corrected. If the error is correctable, then the step 210 sends control to a step 212 wherein the error is displayed by a display of the kiosk. Control is then sent to a step 214 so that the customer can correct the error, wherein control is sent to the step 206 so that the corrected betting slip is diagnostically checked to determine if it is in the proper format. The steps then continue as above.

If there is no error in the step 208, then control is sent to a step 216 of generating a random game card, wherein the random game card includes information from the paper betting slip.

As mentioned above, the betting slip can be an electronic betting slip that is displayed by a display device and filled out electronically. Hence, the flow diagram 200 includes a step 220 of having the customer enter betting slip information electronically. One example of entering betting slip information electronically includes having the customer enter data online. The flow diagram 200 includes a step 222 of diagnostically checking the information entered electronically to determine if it is in the proper format. Control is then sent to a step 213 wherein it is determined if an error has occurred. If the error occurred, then control is sent to the step 220 so that the customer can correct the error, wherein control is sent to the step 222 so that the corrected betting slip is diagnostically checked to determine if it is in the proper format. The steps then continue as above. If there is no error, then control is sent to the step 216, wherein the random game card is generated as described above.

The flow diagram 200 includes a step 224, wherein it is determined if the customer desires for the game card to be in paper. If yes, then a step 226 provides the paper game card. If no, then control is sent to a step 230, wherein the game card is stored in a game card database. The game card database includes one or more game cards for one or more customers. In general, the game cards of the database are for the same live sporting event.

The flow diagram 200 includes a step 232 of checking a square of the game cards of the database. The square is checked to determine if an occurrence of the live sporting event is the same as the predetermined result of the checked square. The flow diagram 200 includes a step 234 to determine if there is a match. If there is no match, then control is sent to a step 236 to determine if the live sporting event is over. If the live sporting event is not over, then control goes to a step 238, wherein a specialist enters the result and the step 232 is implemented again. If the event is over, then control goes to a step 256, wherein the winner receives a payout.

If there is a match in the step 234, then control goes to a step 240, wherein the game card database is updated in the step 230 and control is then sent to the step 232 so another square can be checked. Further, in the step 240, control is sent to a step 242 to check for a winner in a step 244. If there is a winner, then control is sent to a step 246 to determine if there is a duplicate winner. If there is no duplicate winner, then control is sent to a step 248, wherein a winner database is updated in a step 250 and a payout database is updated in a step 252. From the step 250, control is sent to the step 242 to check for a winner. From the step 252, control is sent to a step 254 to validate that the game card is actually a winner. Control is then sent to the step 256, wherein the winner receives the payout.

In the step 244, if there is no winner, then control is sent to a step 260, denoted as A, wherein control is sent to the step 236 to determine if the event is over. The step 236 is described in more detail above. In the step 246, if there is a duplicate winner, then control is sent to the step 260, denoted as A, wherein control is sent to the step 236 to determine if the event is over. The step 236 is described in more detail above.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

What is claimed is:

1. A bingo-style game method, comprised of:

generating a plurality of game cards with each game card containing an m×n matrix of squares with each square containing a pre-populated defined result to compare to randomly-generated defined results whereby matches create marks that may form pre-determined patterns designated as winning patterns;

wherein neither the m rows, n columns, nor the squares of the m×n game card need be identified by any additional classifying designations, symbols or words other than the pre-populated defined results within the squares, said pre-populated defined results are often repetitive and indistinguishable, in order to populate all the squares of the game card;

requiring designating one and only one square from the said matrix of squares on each game card, a subject square, and its pre-populated defined result as the one and only possible match to a then current randomly-generated defined result;

restricting a mark to said subject square if the pre-populated result of said subject square matches the said then current randomly-generated defined result;

designating then another square from said matrix of squares as next said subject square and its pre-populated defined result as the only said possible match to the next said then current randomly-generated defined result;

continuing the process of designating a single square from among said m×n matrix of squares as said subject square and creating a mark if the pre-populated defined result of said subject square matches said then current randomly-generated defined result until all randomly-generated defined results come to a pre-defined conclusion or the game method ends by another pre-determined conclusion.

2. The method of claim 1, in which the randomly-generated defined result comes from a single reoccurring key element within a live sporting event comprised of baseball, American-style football, hockey, rugby, football or basketball.

3. The method of claim 2, wherein the reoccurring key element is comprised of a batter, turnover, seconds in a minute, series of downs, attempted passes, shot on goal or team possessions.

4. The method of claim 1 where in rows 'm' and columns 'n' may be of non-similar lengths or shapes, including offset or overlapping.

5. The method of claim 1, in which the randomly-generated defined result comes from a reoccurring key element at the end of each game, contest or match of a series of games, contests or matches.

6. The method of claim 1, in which the randomly-generated defined result comes from a reoccurring key element at the end of a segment of play comprised of turns, periods, hands, innings, rounds, quarters, halves or ends of games, contests or matches.

7. The method of claim 1 wherein the tiles may be arranged in other geometric patterns, including 3-D configurations.

8. The method of claim 1, in which the randomly-generated defined result comes from a reoccurring key element of a computer delivering 8 or less defined results.

9. The method of claim 1 where the tiles are initially blank and filled by the participant who owns the game card.

10. The method of claim 1, in which the pre-determined conclusion is the first game card exhibiting valid marks on the grid of squares in the pre-determined pattern.

11. The method of claim 1, whereby the subject squares are designated in a sequence such that the pattern designates all the squares from the grid of squares, the subject square, before the pattern repeats itself.

12. The method of claim 11, whereby the sequence starts from the upper left most square of the card grid and moves right one column at a time through all the columns before moving down to the first column of the next row and continuing across all the columns through all the rows before returning to the upper leftmost square and repeating the pattern.

13. The method of claim 11, whereby the sequence goes from left to right and top to bottom through all the squares, then continuing by reversing the direction, thus making the last subject square before the reversal, the first subject square after the reversal, continuing through the squares from right to left and bottom to top returning to the upper leftmost square before repeating the pattern.

14. The method of claim 1, whereby the subject squares are designated in a non-sequential manner providing some squares from among the grid of squares may be designated the subject square more than other squares with no regard to order.

15. The method of claim 14, wherein no square from among the grid of squares shall be designated the subject square a given multiple x times more than any other square.

16. The method of claim 14, whereby the designated subject square may or may not be the same square from among the grid of squares on the plurality of game cards.

17. The method of claim 14, whereby the subject square is not allowed to be the same square as the previously designated subject square.

18. The method of claim 14, whereby the subject square cannot be the same square as or a square adjacent to the previously designated subject square.

19. The method of claim 1, in which each of the plurality of unique game cards created may be used for one or more concurrent games differentiated by the pre-determined winning pattern.

20. The method of claim 1, wherein the subject square is pre-populated with a defined result just prior to the key element delivering a randomly-generated defined result.

21. An apparatus for playing a bingo-style game comprising:

a centrally-processed or multi-hub network generating unique game cards in a plurality of locations for one or more games differentiated by a plurality of criteria, one of several being an event and another being a pre-determined winning pattern, selected utilizing paper and electronic input methods on electronic devices, kiosks, customer service locations and hand-held customer service units;

a secure control number incorporating the game criteria selected during generation, as part, uniquely identifying each game card, the network utilizing the control number for, among other things, the later identification of a paper game card to the network-maintained database equivalent;

an electronic device receiving a broadcast game card of the network-maintained database equivalent, allowing the network to almost instantaneously update all electronically distributed game cards, the control number retrievable on the electronic device by menu selection;

a characterization of the network programming creating said game cards and designating from within said grid of squares the one and only subject square currently in play;

a key element of an event selected as one of the criteria delivers a randomly-generated defined result, the network compares the randomly-generated defined result to the pre-populated defined result in the subject square;

a mark made by the network in the subject square as a result of a match during the comparison, the network designating the next sequential square as the subject square for comparison to the next randomly-generated defined result from the key element of the event;

a network search of the game cards for a group of marks forming a pre-determined pattern as selected in the criteria, the network setting the date and time when a game card exhibits the correct pre-determined pattern then including the game card in the winners database for notification and calculation of prizes;

a broadcast update sent by the network to all the distributed electronic game cards, the network continuing the game characterized by a repeating sequential movement and matching one square at a time until the randomly-generated defined results come to a pre-determined conclusion;

a conclusion to the game whereby the network notifies electronic game cards of any wins and accepts paper game cards at kiosks, electronic devices, customer service locations and hand-held customer service units for validation of their secure control number, delivering instructions for taking possession of any winnings.

22. The apparatus of claim 21, wherein the game card must be filled out manually and verified it was filled out correctly using the secure control number for comparison to the network-maintained database equivalent.

23. The apparatus of claim 21, wherein a game card can be validated for a period of time after the conclusion of the game using the secure control number and instructions provided for taking possession of any winnings.

24. The apparatus of claim 21, wherein the secure control number is an electronically-readable format comprised of bar codes, quick reference codes or the like.

25. The apparatus of claim 21, whereby a winning card is a card exhibiting marks in a winning pattern or winning patterns pre-selected by the player.

* * * * *